United States Patent [19]

Menard

[11] 4,368,455

[45] * Jan. 11, 1983

[54] HEAVY DUTY EMERGENCY POWER PACK FOR VEHICLE TRAILER

[76] Inventor: Roger O. Menard, P.O. Box 1216, Clearfield, Pa. 16830

[*] Notice: The portion of the term of this patent subsequent to Feb. 27, 1996, has been disclaimed.

[21] Appl. No.: 124,742

[22] Filed: Feb. 26, 1980

[51] Int. Cl.³ .................. B60Q 1/26; H01M 2/10
[52] U.S. Cl. ............................ 340/74; 340/81 R; 340/87; 340/90; 340/321; 429/97; 180/68.5; 70/258; 248/500; 248/553; 307/10 LS
[58] Field of Search ............... 340/74, 81 R, 84, 87, 340/90, 114, 321, 331, 332; 307/10 LS; 362/103, 187–191; 429/96–100, 164; 180/68.5; 248/317, 503, 500, 551, 553, 27.1, 200; 70/258, 447–449, 443, 58, 187, 229, 416, 466, 439; 312/245; 292/7, 40, 337; 224/273, 902; 105/50, 51

[56] References Cited

U.S. PATENT DOCUMENTS

| | | | |
|---|---|---|---|
| 3,766,759 | 10/1973 | Artner | 70/58 |
| 3,904,439 | 9/1975 | Barrett | 429/99 |
| 4,001,778 | 1/1977 | Ross | 340/81 R |
| 4,142,172 | 2/1979 | Menard | 340/81 R |

Primary Examiner—John W. Caldwell, Sr.
Assistant Examiner—Donnie Lee Crosland
Attorney, Agent, or Firm—Saidman, Sterne & Kessler

[57] ABSTRACT

A portable, heavy duty emerency power pack for hooking up to the lighting system of a vehicle trailer, such as a semi-trailer, camper, mobile home or the like, for the purpose of flashing all or some of the trailer lights on and off while the trailer is unhitched on the side of a road so as to warn passing motorists of its presence. In a preferred embodiment, the device includes a pair of heavy duty batteries connected in parallel, an on-off switch, a flasher, and a heavy duty case for housing these components. A cable extends from the case and is terminated by an adapter plug for connecting to a mating socket on the vehicle trailer. The case also preferably includes a carrying handle which is operatively connected to means for securing and locking the case to the trailer. The case further includes a lid having a lock device for securing the contents thereof against tampering. On the outside walls of the case may be mounted one or more light reflectors, illuminating work lights, flashing warning lights or the like. Auxiliary warning lights may also be strung from a special connector on the case, and alternate embodiments include the provision of a light-sensitive switch for deactivating the unit during daylight, and an alarm circuit connected to the doors of the trailer for sounding an alarm in the event of unauthorized entry.

24 Claims, 7 Drawing Figures

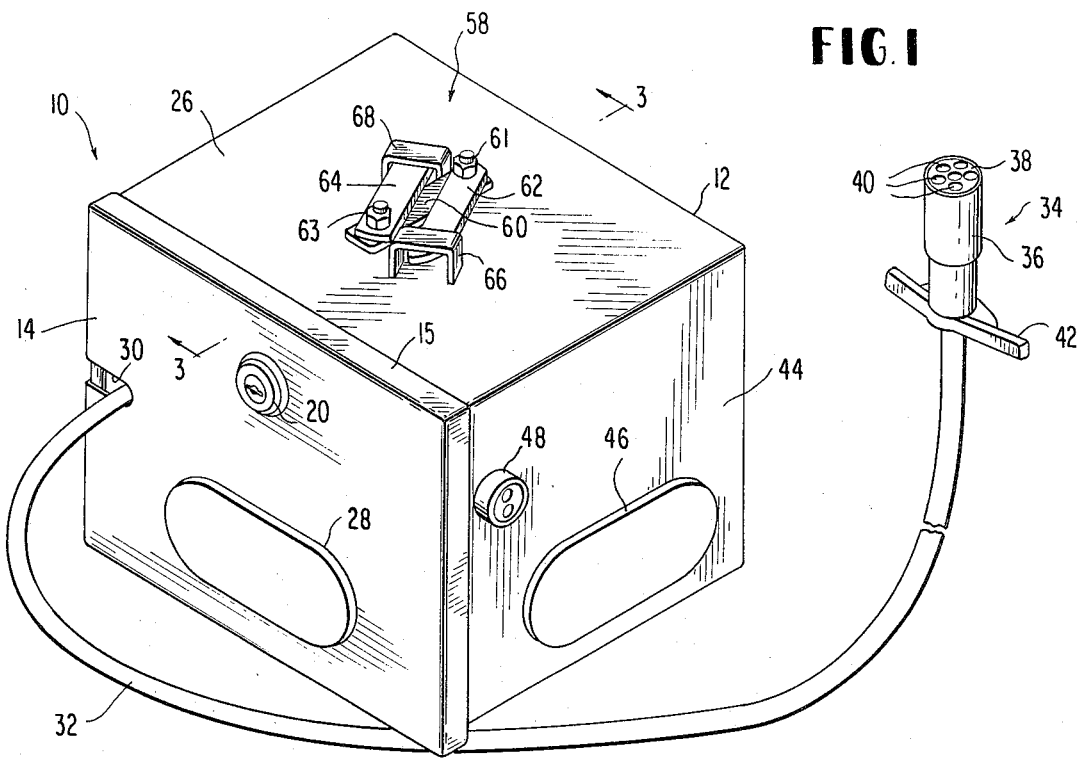
FIG. 1
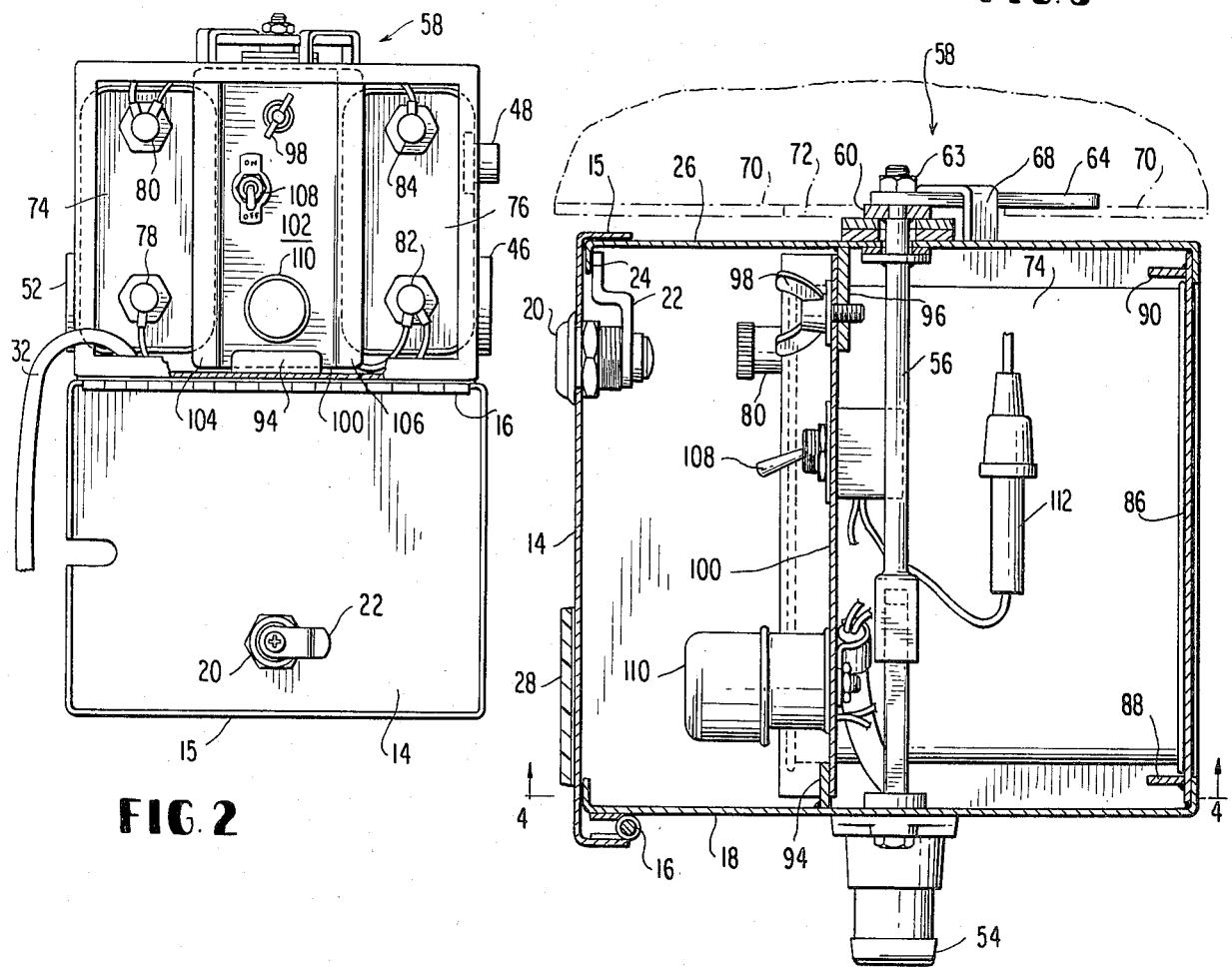
FIG. 2
FIG. 3

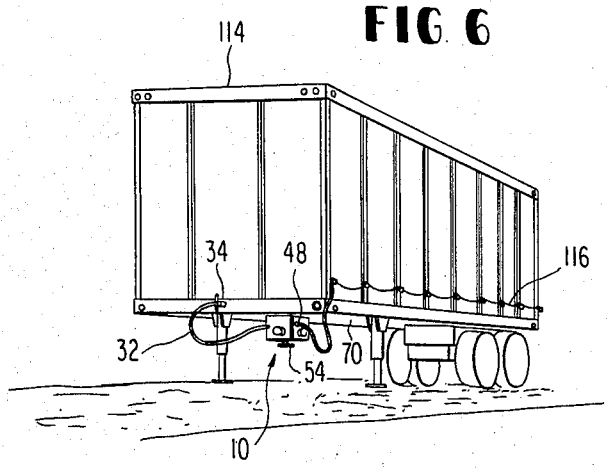
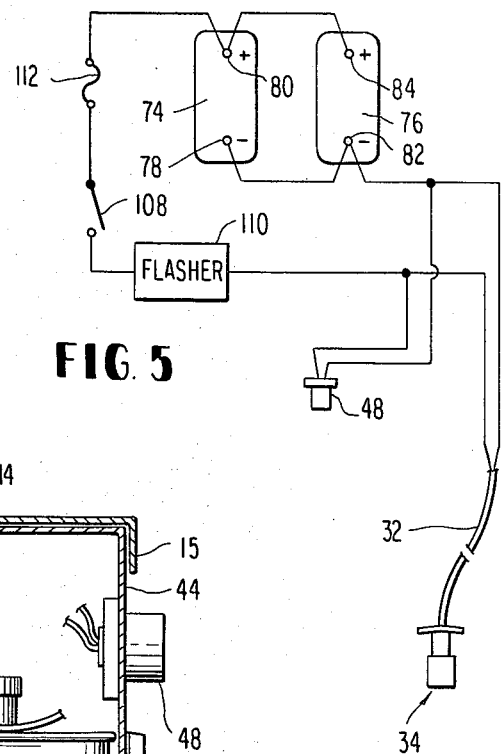
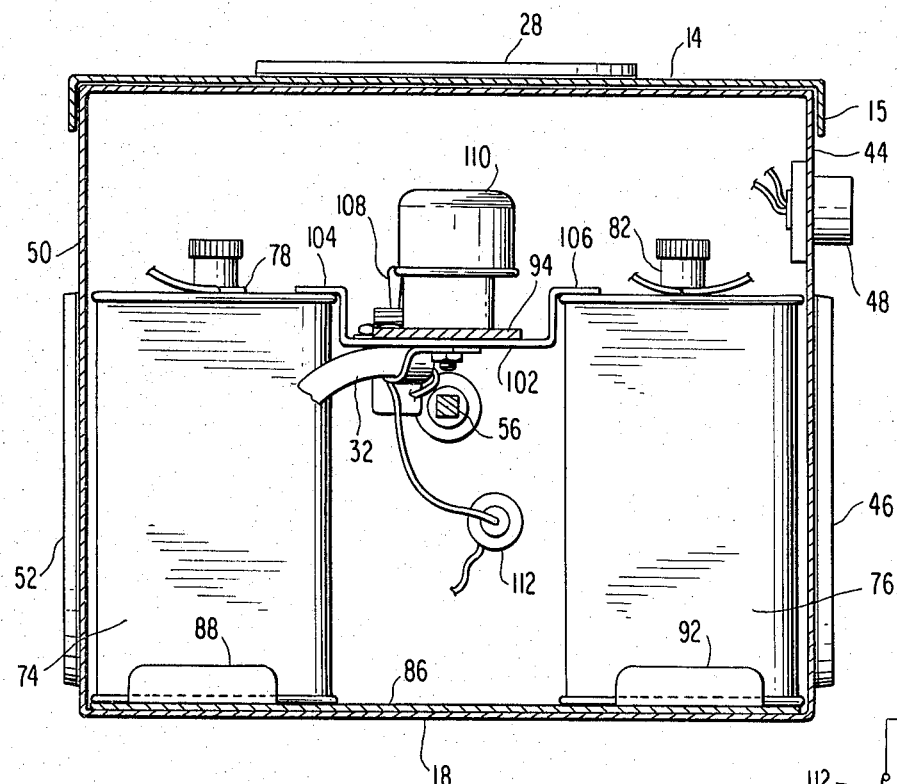
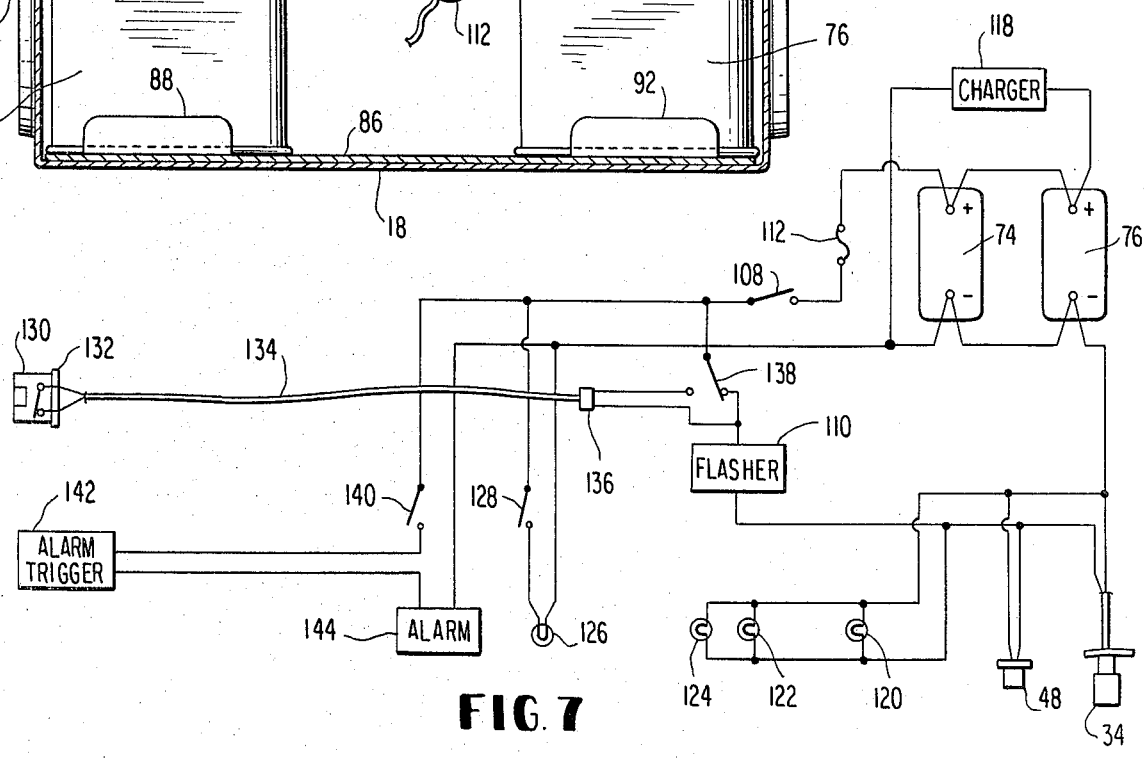

HEAVY DUTY EMERGENCY POWER PACK FOR VEHICLE TRAILER

BACKGROUND OF THE INVENTION

1. Field of the Invention

The present invention is related to emergency power packs and, more particularly, is directed towards a portable battery pack and associated circuitry adapted to be used in connection with unattended or detached trailers for flashing the lights thereof so as to warn oncoming motorists of a potential hazard.

2. Description of the State of the Art

In my earlier U.S. Pat. No. 4,142,172, which issued on Feb. 27, 1979, I teach a device which is provided with its own power supply to be hooked up to the lighting system of a vehicle trailer for the purpose of flashing all or some of the trailer lights on and off while the trailer might be left unattended at the side of a road so as to warn passing motorists of its presence. The emergency power pack therein described included a dry cell battery, a conventional flasher mechanism, an on-off switch, a mounting plate having a handle integrally provided therewith and an adapter plug extending from the mounting plate and designed to mate with a socket on the vehicle's trailer.

My earlier invention, as set forth in my patent, solves the problem of providing a portable, self-contained unit that could be readily transported and plugged into the trailer's lighting system to flash some or all of the lights on the trailer as a warning to motorists, in order to prevent potentially crippling or fatal accidents.

Since the development of my original invention, as set forth in the above-noted patent, I have endeavored to make improvements thereto which would lead to greater acceptance in the marketplace by providing a sturdier, heavy duty unit, which could nevertheless be manufactured from conventionally available components. One of the problems associated with my original invention is that of possible tampering or theft of the unit. If the vehicle trailer is left unattended, one bent on malicious mischief could either turn off the unit, or steal it from the trailer. Either occurrence would obviously defeat the safety provisions for which the unit was originally designed. It became clear to me, therefore, that additional means were necessary in order to secure the unit from theft or tampering. Such recognition led me also to the need for a heavy duty unit which would not fail even if the trailer were left unattended for a long period of time.

Additionally, I have discovered that several features may be added to the basic unit in order to provide an even greater level of safety than heretofore achievable. For example, some provision should be made for turning off the unit during daylight hours if the trailer remains unattended for a long period of time, and then reactivating the unit at nightfall. Additionally, I recognized the desirability of providing for the possibility that some or all of the trailer's lights could be malfunctioning or inoperative. Further, I recognized the need for some type of an alarm system in the event the unattended trailer is broken into.

It is towards providing the above-stated improvements and overcoming the deficiencies of my original design that the present invention is advanced.

Prior art U.S. patents of which I am aware include: U.S. Pat. Nos. 3,063,046; 3,340,503; 3,560,923; 3,694,729; 3,963,972; and 4,017,827.

OBJECTS AND SUMMARY OF THE INVENTION

It is therefore a primary object of the present invention to provide a heavy duty emergency power pack for vehicle trailer lights which improves upon the design of my earlier device, and solves many of the deficiencies noted above.

Another object of the present invention is to provide an emergency power pack for vehicle trailer lights which is compact, portable, readily made from available parts, and is theft and tamper proof.

Another object of the present invention is to provide an emergency power pack for vehicle trailer lights which is equipped to operate auxiliary lighting in the event that the trailer's main lights are inoperative.

A still further object of the present invention is to provide a heavy duty case for supporting the components of the emergency power pack, which case includes means for locking same and means for lockingly securing the case to the trailer to prevent tampering and theft.

An additional object of the present invention is to provide a heavy duty emergency power pack which may be left with an unhitched trailer for extended periods of time, which includes means for deactivating the unit during daylight and reactivating the unit at nightfall, which includes auxiliary power for extended emergencies, and which may be provided with an alarm system for the trailer.

The foregoing and other objects are attained in accordance with one aspect of the present invention through the provision of an emergency power pack adapted to be connected to an unhitched trailer of a tractor-trailer of the type which has a plug on the tractor and a mating socket on the trailer to provide an electrical connection therebetween when unhitched for controlling the lights on the trailer from a first source of power on the tractor, which comprises a second source of power comprising a battery, an adapter plug electrically connected to the battery and adapted to mate with the socket, flasher means electrically connected to the adapter plug and the battery for flashing the lights on the trailer when the adapter plug is mated with the socket when the trailer is unhitched from the tractor, and case means for enclosing the battery and the flasher means, the case means including a handle extending therefrom and means for locking the case means to the trailer.

In accordance with more specific aspects of the present invention, the locking means comprises means operable between a released position and a secured position for releasably securing the case means to the trailer, and means for locking the securing means in either the released position or the secured position. The securing means more particularly includes the handle which is rotatably mounted to one wall of the case means, rotatable keeper means mounted on and extending from another wall of the case means, and shaft means extending through the case and operatively connecting the handle and the keeper means. The means for locking the securing means preferably comprises a key lock mechanism mounted in the handle.

In accordance with further aspects of the present invention, the case means preferably includes a pivotally mounted lid and means for locking the lid for preventing access to the contents of the case means. The lid may also include light reflector means mounted thereon as an additional safety feature.

Even more particularly, the case means comprises a substantially rectangular solid enclosure including a pivotally mounted lid, a top wall, a bottom wall and a pair of side walls which form an opening with the top and bottom walls, the lid being adapted to close such opening. Means may also be provided for retaining the battery in the case, such means comprising a bracket and flange means positioned in the case means for securing the bracket thereto. The flasher means is preferably mounted on the bracket, along with switch means for controlling the power from the battery.

In accordance with another aspect of the present invention, a cable is connected to the battery and the flasher means and extends from the case, the adapter plug being connected to the free end of the cable.

A second battery may also be connected in parallel with the first battery in order to provide a long life backup capability. The case may also have a connector means mounted thereon which is in circuit with the battery and flasher means for receiving auxiliary flashing light means. Such auxiliary flashing light means preferably comprises a string of lights adapted to be placed along the side of the trailer in an emergency.

In accordance with other features of the present invention, a work light may be connected in circuit with the battery, and may be mounted either on the case itself or may be extended therefrom. At least one light may also be mounted on the case and connected in circuit with the flasher means and the battery for providing a warning signal at the front of the unhitched trailer.

In accordance with another aspect of the present invention, light sensitive switch means may be connected in circuit with the flasher means and the battery for controlling the actuation of the lights on the trailer according to ambient light. The light sensitive switch means may be remotely located from the case means so as to be insensitive to light sources other than ambient.

In accordance with another aspect of the present invention, alarm means may be provided which are connected in circuit with the battery for sounding an alarm when the doors of the trailer are opened.

In accordance with yet another aspect of the present invention, apparatus is provided which comprises means for supporting a battery that comprises an enclosed case having a movable lid, means for locking the lid to secure the contents of the case, a handle extending from the case, means extending from the case for securing the case to a trailer, and means operatively associated with the securing means for locking the case to the trailer. An adapter plug may extend from the case and is adapted to be connected to a mating socket on the trailer, and means may also be provided for connecting the handle to the securing means for permitting operation of the latter by the former, the locking means being formed in the handle.

BRIEF DESCRIPTION OF THE DRAWINGS

Various objects, features and attendant advantages of the present invention will be more fully appreciated as the same become better understood from the following detailed description of the present invention when considered in connection with the accompanying drawings, in which:

FIG. 1 is a perspective view of a preferred embodiment of the heavy duty emergency power pack of the present invention;

FIG. 2 is a front view of the preferred embodiment of FIG. 1 shown with the lid in its open position;

FIG. 3 is a cross-sectional view of the preferred embodiment of FIG. 1 taken along lines 3—3 thereof;

FIG. 4 is a vertical sectional view of the preferred embodiment illustrated in FIG. 3 and taken along lines 4—4 thereof;

FIG. 5 is a schematic circuit diagram of the electrical components of the preferred embodiment;

FIG. 6 is a perspective view of an unhitched trailer having the device of the present invention attached thereto; and FIG. 7 is a schematic circuit diagram illustrating alternate embodiments and features of the present invention.

DETAILED DESCRIPTION OF THE PREFERRED EMBODIMENTS

Referring now to the drawings, wherein like reference numerals represent identical or corresponding parts throughout the several views, and more particularly to FIG. 1 thereof, a preferred embodiment of the heavy duty emergency power pack of the present invention is indicated generally by reference numeral 10.

The power pack 10 of the present invention includes a housing or case 12 which is preferably formed of a heavy gauge (e.g., 14) metal. However, case 12 may be formed of a heavy duty plastic, or other synthetic material, as may be desired. Case 12 includes a lid 14 which is pivotally secured to the case 12 as by a hinge 16 (FIGS. 2 and 3). The hinge 16 is coupled to a bottom wall 18.

Lid 14 includes a downwardly depending outer flange 15 extending about the periphery thereof. A key lock 20 having a pivotable keeper 22 is provided in lid 14 for securing same to a lateral flange 24 of the top wall 26 of case 12. The unlocked position of keeper 22 is illustrated in FIG. 2, while the locked position thereof is illustrated in FIG. 3.

Lid 14 further preferably includes a light reflecting element 28 mounted on the surface thereof. Reflector 28 may alternately consist of a flashing amber light, or an illuminating work light, as will be explained below in connection with the alternate embodiment of FIG. 7.

Formed in the side wall of lid 14 is a cutout 30 though which a cable 32 extends from the inside of case 12. Cable 32 terminates in an adapter plug indicated generally in FIG. 1 by reference numeral 34. Plug 34 is of the type which is designed to mate with a similarly sized socket normally mounted on the vehicle trailer. Plug 34 may be of the same nature as that normally provided on the vehicle tractor for connecting the tractor's power supply and controls to the lighting system of the trailer. Plug 34 normally includes an outer metal case 36, a plastic plug molding 38 within case 36, and a plurality of conductors 40, one of which normally comprises a ground conductor. Plug 34 may also include finger grips 42 extending laterally therefrom to facilitate installation and removal in the mating socket (not shown).

Case 12 also includes a side wall 44 having a reflector 46 positioned thereon as well as an additional plug 48 mounted thereto. Plug 48 is provided for the purpose of interconnecting to the device's power supply a string of auxiliary lights 116 (see FIG. 6) for a purpose which will be described in greater detail hereinafter.

Opposite to the side wall 44 is a substantially parallel side wall 50 having a similar reflector 52 positioned thereon. Either or both of the reflectors 46 and 52 may, as mentioned above, be replaced by either illuminating work lights or amber flashing lights as may be desired.

Referring now to FIG. 3, extending from the bottom wall 18 of case 12 is a handle 54 which preferably has a key lock mechanism integral therewith. Connected to rotate with handle 54 and extending through the interior of case 12 is a shaft 56 to the opposite end of which is fastened an attaching mechanism indicated generally by reference numeral 58.

FIG. 1 illustrates attaching mechanism 58 in its released position, and is seen to include a pivot bar 60 which is secured to turn with shaft 56 and handle 54. Pivotally mounted as at 61 and 63 to the ends of pivot bar 60 are a pair of locking bars or keepers 62 and 64. A pair of guides 66 and 68 are secured to the top wall 26 of case 12 for guiding locking bars 62 and 64 from their released position to their locked position as shown in FIG. 3. It may be appreciated that the mechanism 58, which is used for attaching the case 12 to the trailer, operates in a manner analogous to that of a common garage door handle and locking mechanism with the exception, of course, that the present invention requires an extended shaft 56 through the case 12.

Referring back to FIG. 3, reference numeral 70 represents a heavy steel gauge plate that comprises the lower wall of a semi-trailer. In many such trailers, a square hole or opening 72 is provided near the forward end of the trailer to provide access to other components mounted upwardly of plate 70. Hole 72 is normally located near the kingpin of the trailer. Clearly, if such an aperture does not already exist, suitable provision may be made to form same for permitting the case 12 to be attached in the manner described.

With the attaching mechanism 58 in the withdrawn or released position illustrated in FIG. 1, case 12 is placed adjacent plate 70 so that the mechanism 58 extends through aperture 72. Thereafter, handle 54 is rotated to extend the keepers 62 and 64 through their respective guides 66 and 68 so as to engage the inside upper surface of plate 70 as shown in FIG. 3. Handle 54 may then be locked by a suitable key (not shown) which effectively prevents removal of case 12 from the trailer.

Referring again to FIGS. 2, 3 and 4, inside case 12 are positioned a pair of batteries 74 and 76 each of which preferably comprises a heavy duty 12 volt battery, such as Model 926 manufactured by Ray-O-Vac ®. It is clear, however, that other models of batteries may be equally suitable, and rechargeable batteries may in fact be desired.

Battery 74 includes a negative terminal 78 and a positive terminal 80, while battery 76 includes a negative terminal 82 and a positive terminal 84.

Positioned over the bottom wall 18 of case 12 is a mounting plate 86 upon which are mounted a set of upstanding support flanges 88 and 90 (FIG. 3) for holding battery 74 in place. Reference numeral 92 in FIG. 4 indicates a similar flange for holding battery 76 in proper position.

Extending inwardly from the inside surface of bottom wall 18 is a retaining flange 94. A similar flange 96 extends from the inside surface of top wall 26. Flange 96 includes a threaded aperture for receiving a wing nut screw 98 which is utilized to secure a retaining plate 100 onto flanges 96 and 94. In installation of plate 100, after batteries 74 and 76 are in position, the lower end of the plate (as viewed in FIGS. 2 and 3) is initially inserted underneath flange 94, and then wing nut screw 98 is utilized to secure the upper end thereof to flange 96.

FIG. 4 illustrates the retaining plate 100 as including a substantially flat base 102 along the edges of which extend a pair of upstanding right angle flanges 104 and 106. Flanges 104 and 106 are adapted to secure the adjacent edges of battery 74 and 76 respectively, to retain same in place within case 12.

As may be seen in FIGS. 2-4, an on-off switch 108 is mounted on base 102, as is a flasher unit 110 which may be conventional. A fuse 112 is also located in the space under plate 100 and between batteries 74 and 76. Fuse 112 is in circuit with switch 108 and batteries 74 and 76, as may be seen in FIG. 5 which is a schematic circuit diagram illustrating the various components discussed thus far in connection with the preferred embodiment.

Illustrated in FIG. 6 is a perspective view of a detached semi-trailer 114 having the power pack 10 of the present invention secured to the underside plate 70 thereof in the manner set forth in greater detail above. A string of lights 116 are shown connected to connector 48, while cable 32 extends from power pack 10 to adapter plug 34 which is shown in position within its mating socket. In this position, with switch 108 closed, the lights on string 116 will flash, as well as the stop lights of the trailer 114 so as to warn oncoming motorists of a potential hazard. Such a string of lights may be conveniently stored in case 12. Unit 10 is tamper proof and theft proof so that if the driver must leave the trailer 114 unattended, the power pack 10 will continue to perform its function. Dual batteries 74 and 76 are provided for extended life of the unit during what may be an extended time during which trailer 114 is unattended.

Referring now to FIG. 7, there is illustrated a schematic circuit diagram which presents several alternate embodiments and features which may be adapted to the basic improved power pack as described hereinabove. Initially, batteries 74 and 76 may be of the rechargeable variety (e.g. nickel-cadmium) which are charged through a charging unit 118.

Instead of or in addition to reflectors 28, 46 and 52, a plurality of amber flashing lights 120, 122 and 124 may be provided on the sides of the case 12.

Further, a work light 126 may be provided on lid 14 or as an accessory spotlight to be controlled by a suitably located switch 128.

A further modification includes the provision of a light sensitive switch 130 for deactivating the flasher 110 during daylight hours to save wear and tear on the batteries. Switch 130 would operate, of course, to reinitiate operation of flasher 110 at nightfall. The light sensitive switch 130 may include a magnetic base 132 for mounting same at a suitable remote location (e.g., the trailer roof) where its operation would not be influenced by vehicle traffic lights or the like. A cable may be provided to extend from the switch 130 to a suitable connector 136 which may also be positioned on case 12. Additionally, a selector switch 138 inside case 12, and preferably mounted on plate 100, could be provided for choosing manual or automatic operation of the device. In this manner, the unit could be made to be operable over twice the normal period of time in the event the trailer has to be left unattended for a long period of time.

A still further modification to the basic invention includes the provision of an alarm sensor 142 which can comprise a switch that closes when the trailer door opens to sound an alaram 144. Alarm trigger 142 could be rendered sensitive by an alarm switch 140 which would also be suitably located within case 12 in order that its function may not be defeated by vandals.

Obviously, numerous modifications and variations of the present invention are possible in light of the above teachings. It is therefore to be understood that within the scope of the appended claims, the invention may be practiced otherwise than as specifically described herein.

I claim as my invention:

1. An emergency power pack adapted to be connected to an unhitched trailer of a tractor-trailer of the type which has a plug on said tractor and a mating socket on said trailer to provide an electrical connection therebetween when hitched for controlling the lights on said trailer from a first source of power on said tractor, which comprises:
   a second source of power comprising a battery;
   an adpater plug electrically connected to said battery and adapted to mate with said socket;
   flasher means electrically connected to said adapter plug and said battery for flashing the lights on said trailer when said adapter plug is mated with said socket when said trailer is unhitched from said tractor; and
   case means for enclosing said battery and said flasher means, said case means including a handle extending therefrom and means for locking said case means to said trailer.

2. The emergency power pack as set forth in claim 1, wherein said locking means comprises:
   means operable between a released position and a secured position for releasably securing said case means to said trailer; and
   means for locking said securing means in either said released position or said secured position.

3. The emergency power pack as set forth in claim 2, wherein said securing means includes said handle which is rotatably mounted to one wall of said case means, rotatable keeper means mounted on and extending from another wall of said case means, and shaft means extending through said case and operatively connecting said handle and said keeper means.

4. The emergency power pack as set forth in claim 3, wherein said means for locking said securing means comprises a key lock mechanism mounted in said handle.

5. The emergency power pack as set forth in claim 1, wherein said case means includes a pivotally mounted lid and means for locking said lid for preventing access to the contents of said case means.

6. The emergency power pack as set forth in claim 5, wherein said lid includes light reflector means mounted thereon.

7. The emergency power pack as set forth in claim 1, wherein said case means comprises a substantially rectangular solid enclosure including:
   a pivotally mounted lid;
   a top wall;
   a bottom wall; and
   a pair of side walls forming an opening with said top and bottom walls;
   said lid adapted to close said opening.

8. The emergency power pack as set forth in claim 7, further comprising means for retaining said battery in said case means.

9. The emergency power pack as set forth in claim 8, wherein said retaining means comprises a bracket, and flange means positioned in said case means for securing said bracket.

10. The emergency power pack as set forth in claim 9, wherein said flasher means is mounted on said bracket.

11. The emergency power pack as set forth in claim 10, further comprising switch means mounted on said bracket for controlling the power from said battery.

12. The emergency power pack as set forth in claim 1, further comprising a cable connected to said battery and flasher means and extending form said case, said adapter plug connected to the free end of said cable.

13. The emergency power pack as set forth in claim 1, further comprising a second battery connected in parallel with said second source of power.

14. The emergency power pack as set forth in claim 1, further comprising connector means mounted on said case means and in circuit with said battery and flasher means for receiving auxiliary flashing light means.

15. The emergency power pack as set forth in claim 14, wherein said auxiliary flashing light means comprises a string of lights adapted to be placed along the side of said trailer in an emergency.

16. The emergency power pack as set forth in claim 1, further comprising a work light connected in circuit with said battery.

17. The emergency power pack as set forth in claim 1, further comprising at least one light mounted on said case means and connected in circuit with said flasher means and said battery.

18. The emergency power pack as set forth in claim 1, further comprising light-sensitive switch means connected in circuit with said flasher means and said battery for controlling the actuation of said lights on said trailer according to ambient light.

19. The emergency power pack as set forth in claim 18, wherein said light-sensitive switch means is remotely located from said case means.

20. The emergency power pack as set forth in claim 1, further comprising alarm means connected in circuit with said battery for sounding an alarm when the doors of said trailer are opened.

21. The emergency power pack set forth in claim 1, wherein said battery comprises a rechargeable battery.

22. The emergency power pack as set forth in claim 7, further comprising light reflector means mounted on said lid and said side walls.

23. Apparatus, which comprises:
   means for supporting a battery which comprises an enclosed case having a movable lid, means for locking said lid to secure the contents of said case, a handle extending from said case, means extending from said case for securing said case to a trailer, means operatively associated with said securing means for locking said case to said trailer, and an adapter plug extending from said case and adapted to be connected to a mating socket on said trailer.

24. The apparatus as set forth in claim 23, further comprising means connecting said handle to said securing means for permitting operation of the latter by the former, said locking means being formed in said handle.

* * * * *